(12) United States Patent
Bird et al.

(10) Patent No.: US 10,180,033 B2
(45) Date of Patent: Jan. 15, 2019

(54) MECHANICALLY LOCKING POLYCRYSTALLINE DIAMOND ELEMENT AND INDUSTRIAL DEVICE

(71) Applicant: Halliburton Energy Services, Inc., Houston, TX (US)

(72) Inventors: Jay S. Bird, The Woodlands, TX (US); Shilin Chen, Montgomery, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/914,712

(22) PCT Filed: Sep. 30, 2013

(86) PCT No.: PCT/US2013/062564
§ 371 (c)(1),
(2) Date: Feb. 26, 2016

(87) PCT Pub. No.: WO2015/047376
PCT Pub. Date: Apr. 2, 2015

(65) Prior Publication Data
US 2016/0201399 A1  Jul. 14, 2016

(51) Int. Cl.
*E21B 10/573* (2006.01)
*E21B 10/55* (2006.01)
(Continued)

(52) U.S. Cl.
CPC .......... *E21B 10/573* (2013.01); *B23K 31/025* (2013.01); *B24D 99/005* (2013.01); *E21B 10/55* (2013.01)

(58) Field of Classification Search
CPC ...... E21B 10/576; E21B 10/55; E21B 10/567; E23K 31/025; E21D 99/005
(Continued)

(56) References Cited

U.S. PATENT DOCUMENTS 4,200,159 A   4/1980  Jurgens et al.
5,351,772 A  10/1994  Smith
(Continued)

FOREIGN PATENT DOCUMENTS

WO   2012/149086   11/2012

OTHER PUBLICATIONS

Office Action received for Canadian Patent Application No. 2920119, dated Dec. 6, 2016; 3 pages.
(Continued)

*Primary Examiner* — David J Bagnell
*Assistant Examiner* — Yanick A Akaragwe
(74) *Attorney, Agent, or Firm* — Baker Botts L.L.P.

(57) ABSTRACT

The present disclosure relates to an industrial device including a PCD element located in a recess of the industrial device. The PCD element and recess may contain an aligned mechanical lock. The device may also include a brazing material located along at least a portion of an interface between the PCD element and the recess. In a more specific embodiment, the industrial device may be an earth-boring drill bit, such as a fixed cutter drill bit, and the PCD element may be PCD cutter. In specific embodiments, the mechanical lock may include at least one ridge located at an end of the PCD element and in an end wall of the recess, at least one ridge located along a side of the PCD element and in a side wall of the recess, or at least an upper wall of the recess.

5 Claims, 4 Drawing Sheets

(51) Int. Cl.
    *B23K 31/02*     (2006.01)
    *B24D 99/00*     (2010.01)

(58) Field of Classification Search
    USPC .......................................................... 175/432
    See application file for complete search history.

(56) References Cited

U.S. PATENT DOCUMENTS

| | | | |
|---|---|---|---|
| 5,486,137 | A | 1/1996 | Flood et al. |
| 5,590,728 | A | 1/1997 | Matthias et al. |
| 5,678,645 | A | 10/1997 | Tibbiti |
| 6,026,919 | A | 2/2000 | Thigpen et al. |
| 6,068,072 | A | 5/2000 | Besson et al. |
| 6,077,591 | A | 6/2000 | Griffin |
| 6,258,139 | B1* | 7/2001 | Jensen ............... B23B 27/141 |
| | | | 428/408 |
| 6,315,067 | B1 | 11/2001 | Fielder |
| 7,389,834 | B1 | 6/2008 | Kebmalyan |
| 8,132,633 | B2 | 3/2012 | Maindreville et al. |
| 8,863,864 | B1* | 10/2014 | Miess .............. E21B 10/5673 |
| | | | 175/331 |
| 2005/0089440 | A1* | 4/2005 | Kembaiyan ....... B23B 27/148 |
| | | | 420/502 |
| 2009/0008155 | A1 | 1/2009 | Sherwood, Jr. |
| 2009/0020339 | A1 | 1/2009 | Sherwood, Jr. |
| 2009/0256413 | A1* | 10/2009 | Majagi ................ B28D 1/188 |
| | | | 299/100 |
| 2010/0314176 | A1 | 12/2010 | Zuang et al. |
| 2011/0127088 | A1 | 6/2011 | Voronin et al. |
| 2011/0297454 | A1 | 12/2011 | Shen et al. |
| 2012/0073881 | A1 | 3/2012 | Shen et al. |
| 2012/0080931 | A1* | 4/2012 | Wang ................ E21C 35/183 |
| | | | 299/113 |
| 2012/0273280 | A1 | 11/2012 | Zhang et al. |
| 2013/0263519 | A1* | 10/2013 | Lin ...................... E21B 10/567 |
| | | | 51/295 |

OTHER PUBLICATIONS

Office Action received for Chinese Patent Application No. 201380078973.0, dated Jan. 4, 2017; 12 pages.
Office Action received for Chinese Patent Application No. 201380078973.0, dated Jun. 1, 2017; 9 pages.
International Search Report and Written Opinion, Application No. PCT/US2013/062564, 13 pages, dated Jun. 26, 2014.
International Preliminary Report on Patentability, Application No. PCT/US2013/062564, 15 pages, dated Aug. 9, 2015.
"Z3™ PDC Cutter, Tackling Hard Rock Applications by Combining Abrasion, Impact Resistance, and Thermal Mechanical Integrity," Halliburton, Security DBS, dated 2004.
Office Action received for Chinese Patent Application No 201380078973.0, dated Nov. 15, 2017; 12 pages.

* cited by examiner

MECHANICALLY LOCKING POLYCRYSTALLINE DIAMOND ELEMENT AND INDUSTRIAL DEVICE

RELATED APPLICATIONS

This application in a U.S. National Stage Application of International Application No. PCT/US2013/062564 filed Sep. 30, 2013, which designates the U.S., and which is incorporated herein by reference in its entirety.

TECHNICAL FIELD

The current disclosure relates to polycrystalline diamond (PCD) elements and industrial devices, such as earth-boring drill bits having a mechanical lock at an interface where a braze joint is also formed.

BACKGROUND

Components of various industrial devices are often subjected to extreme conditions, such as high-temperatures and high-impact contact with hard and/or abrasive surfaces. For example, extreme temperatures and pressures are commonly encountered during earth drilling for oil extraction or mining purposes. Diamond, with its unsurpassed mechanical properties, can be the most effective material when properly used in a cutting element or abrasion-resistant contact element for use in earth drilling. Diamond is exceptionally hard, conducts heat away from the point of contact with the abrasive surface, and may provide other benefits in such conditions.

Diamond in a polycrystalline form has added toughness as compared to single-crystal diamond due to the random distribution of the diamond crystals, which avoids the particular planes of cleavage found in single-crystal diamond. Therefore, polycrystalline diamond (PCD) is frequently the preferred form of diamond in many drilling applications. A drill bit cutting element that utilizes PCD is commonly referred to as a polycrystalline diamond cutter (PDC). Accordingly, a drill bit incorporating PCD cutting elements may be referred to as a PDC bit.

PCD elements can be manufactured in a press by subjecting small grains of diamond and other starting materials to ultrahigh pressure and temperature conditions. One PCD manufacturing process involves forming polycrystalline diamond directly onto a substrate, such as a tungsten carbide substrate. The process involves placing a substrate, along with loose diamond grains mixed with a catalyst binder, into a container of a press, and subjecting the contents of the press to a high-temperature, high-pressure (HTHP) press cycle. The high temperature and pressure cause the small diamond grains to form into an integral PCD intimately bonded to the substrate.

Once formed, the PCD element can then be attached to a drill bit via the substrate. Due to difference in materials properties such as wettability, a substrate is typically easier to bond to another surface than diamond is when using certain methods. For example, a PCD element can be attached at its substrate to the drill bit via soldering or brazing, whereas PCD without a substrate could not be easily bonded to a drill bit with sufficient strength to withstand the conditions of drilling. Soldering and brazing may be performed at relatively low temperatures at which the PCD portion of the element remains stable, so that the PCD portion is not adversely affected by the process of joining to the bit.

BRIEF DESCRIPTION OF THE DRAWINGS

A more complete understanding of the present embodiments and advantages thereof may be acquired by referring to the following description taken in conjunction with the accompanying drawings, which show particular embodiments of the current disclosure, in which like numbers refer to similar components, and in which.

DETAILED DESCRIPTION

Figure 1:
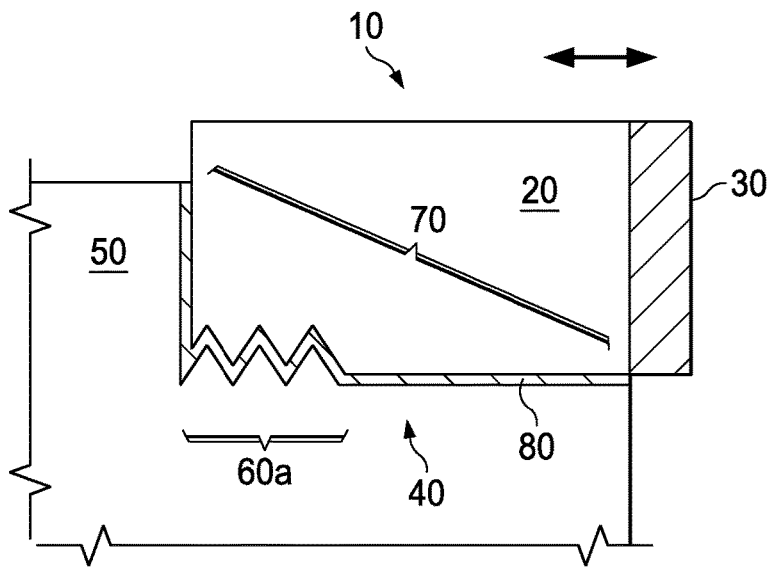
FIG. 1 is a side view of a PCD element and industrial device with a mechanical lock.

The current disclosure relates to a PCD element having a mechanical lock as well as an industrial device having a mechanical lock located in a recess. The mechanical lock of the PCD element may interface with the mechanical lock of the recess such that when the PCD element is located in the industrial device, the mechanical lock engages, limiting movement of the PCD element within or out of the recess.

The current disclosure further relates to an industrial device containing a PCD element in which such a mechanical lock of the PCD element and recess in the industrial device are aligned. The industrial device and methods described herein may additionally facilitate locating the PCD element is correctly in a recess in the device, establishing the correct gap between itself and the walls of the recess, correctly aligning the element within the industrial device, or providing more surface area between the PCD element and the recess for adherence by the brazing material.

The mechanical lock may be designed to maintain a uniform clearance between the PCD element and the recess along at least a portion of the interface between the PCD element and the recess. It may be designed such that forces generated during use of the device are transferred to a larger interface area, helping to prevent movement of the PCD element in the recess or to retain the PCD element in the recess. The mechanical lock may also be designed to exert an additional force on the PCD element during use of the industrial device to help prevent movement of the PCD element in the recess or to retain the PCD element in the recess.

The industrial device may further contain a brazing material located along at least a portion of the interface between the PCD element and the recess. In some embodiments, a brazing material may be located along substantially all of the interface. In other embodiments, brazing material may be located primarily at the mechanical lock. In still other embodiments, it may be located primarily along a portion of the interface between the PCD element and the recess that is not the mechanical lock.

The brazing material may be provided in any form, but in particular embodiments it may be in the form of a thin foil or a wire. It may be designed such that the foil has a uniform thickness between the substrate and the recess along at least a portion of the interface is formed during brazing process. This uniform thickness of the foil may facilitate formation of a uniform clearance between the PCD element and the recess. It may be designed such that contact area between the substrate and the recess along at least a portion of the interface is increased so that the strength of the braze joint is increased. The brazing material may be composed of any materials able to form a braze joint between the PCD element and the pocket. In particular embodiments it may include manganese (Mn), aluminum (Al), phosphorus (P), silicon (Si), or zinc (Zn) alloyed with nickel (Ni), copper (Cu) or silver (Ag).

The PCD element may be located in the recess such that substantially only a substrate portion of the PCD element lies along the interface, with substantially none of the PCD located along the interface. Such an arrangement may protect the PCD from materials and temperatures used in the brazing process. Such an arrangement may also make the maximum area of PCD available for cutting. In some embodiments, substantially all of the substrate may be located within the recess to provide maximum mechanical stability or attachment of the PCD element to the industrial device.

The PCD element may be brazed into an industrial device by placing the PCD element and a brazing material into the recess, such that the mechanical lock is aligned, then heating the brazing material to a temperature sufficient for a braze joint to form between the PCD element and the recess along at least a portion of the interface. Typically the brazing material may be heated to at least its melting point. The brazing material may be placed in the recess prior to placement of the PCD element. Additionally, because the brazing material may be displaced from its original position during the brazing process, for example by melting or movement of the PCD element, it need not cover the entire area to be brazed prior to the brazing process.

The PCD element may also be removed from the recess by re-heating the brazing material, typically to at least its melting point, then physical dislocating the PCD element. A new PCD element may then be inserted into the recess and attached via a braze joint.

Alternatively, in some embodiments where the mechanical lock is symmetrical around an axis of rotation, the PCD element may be rotated in the recess by heating the brazing material to a temperature sufficient to allow movement of the PCD element. This ability to rotate a PCD element while still maintaining a mechanical lock may increase overall industrial device or PCD element life by allowing worn areas of the PCD element to moved and replaced with less worn areas without switching to an entirely new PCD element.

One embodiment of the PCD element and industrial device with a mechanical lock is shown in FIG. 1. PCD element 10, containing substrate 20 and PCD 30 are located in recess 40 of industrial device 50. Mechanical lock 60a is formed along interface 70 and include aligned features of PCD element 10 and industrial device 50. Brazing material 80, in the embodiment shown, is located along substantially all of interface 70, although in other embodiments it may be located along portions of interface 70 as described above. Mechanical lock 60a helps prevent motion of PCD element 10 in the directions indicated by the arrow.

Mechanical lock 60a includes at least one or a series of ridges located along the side of PCD element 10 and in a side wall of recess 40. These ridges may have a triangular cross-section as shown, or they may have other configurations, such as a rectangular or ellipsoid cross-section. Mechanical lock 60b may also combine different cross section shapes.

In a specific embodiment, similar to that shown in FIG. 1, mechanical lock 60 may contain two ridges, one located along the side of PCD element 10, and the other in a side wall of recess 40. The ridges may be configured to form a threaded mechanism, such as a screw. Such an embodiment may provide additional mechanical strength to interface 70.

Figure 2:
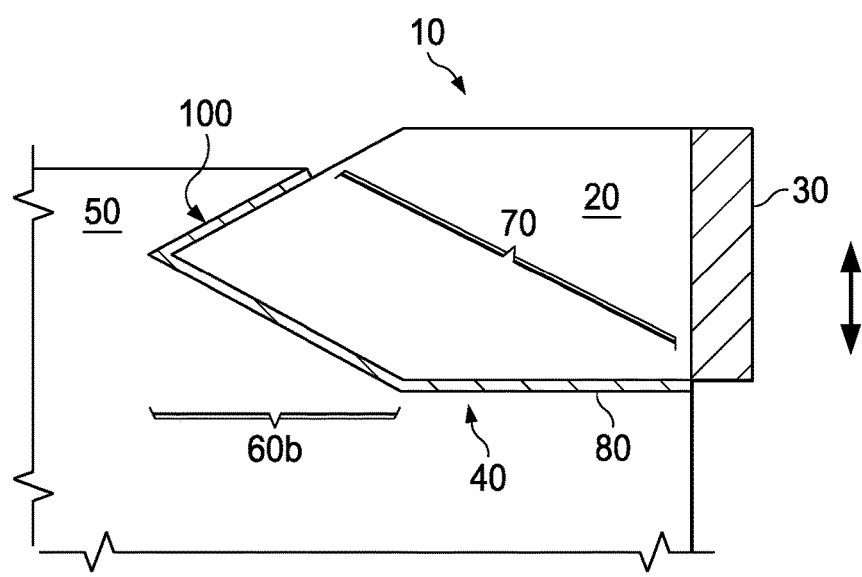
FIG. 2 is a side view of another PCD element and industrial device with a mechanical lock.

In the embodiment shown in FIG. 2, mechanical lock 60b is located in the end of PCD element 10 and in an end wall of recess 40. Mechanical lock 60b helps prevent motion of the PCD element 10 in the directions indicated by the arrow. Mechanical lock 60b includes upper wall 100 of recess 40. Although mechanical lock 60b is shown with a substantially angled cross-section, other configurations, such as a rectangular or ellipsoid cross-section may also be suitable. Mechanical lock 60b may also combine different cross-section shapes.

Figure 3A:
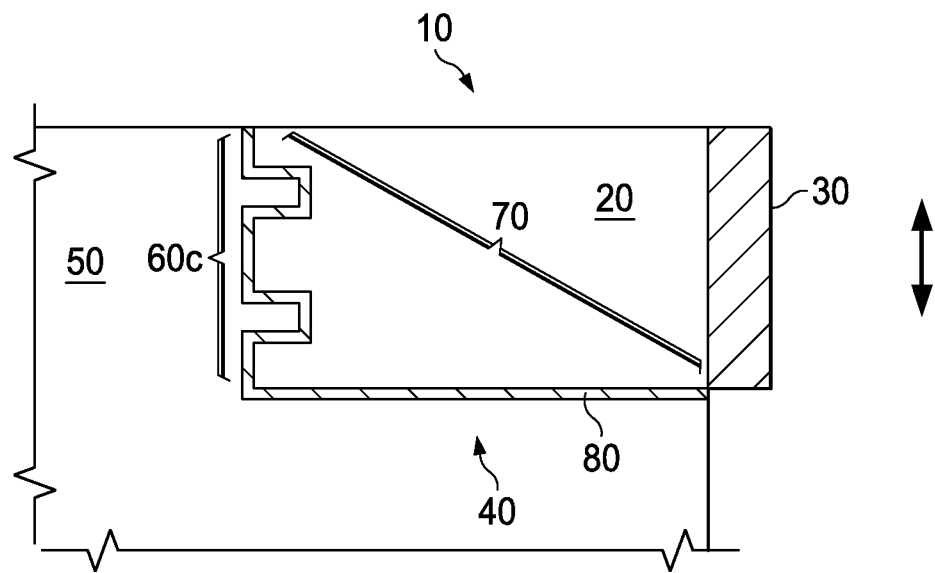
FIG. 3A is a side view of a third PCD element and industrial device with a mechanical lock.
Figure 3B:
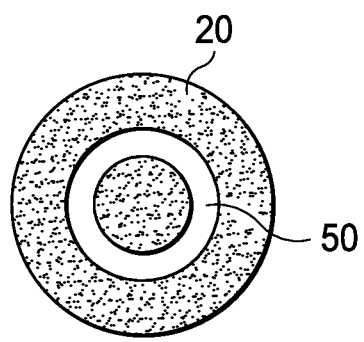
FIG. 3B is an end view of the mechanical lock of the PCD element of FIG. 3A.

As shown in FIG. 3A, mechanical lock 60c may include at least one or a series of concentric ridges located at the end of PCD element 10 and in an end wall of recess 40. Mechanical lock 60c helps prevent motion of the PCD element 10 in the directions indicated by the arrow. The ridges of mechanical lock 60c are shown with a substantially rectangular cross-section, but they may have other configurations, such as an angular or ellipsoid cross-section. Mechanical lock 60c may also combine different cross-section shapes. FIG. 3B shows an end view of mechanical lock 60c.

Figure 4A:
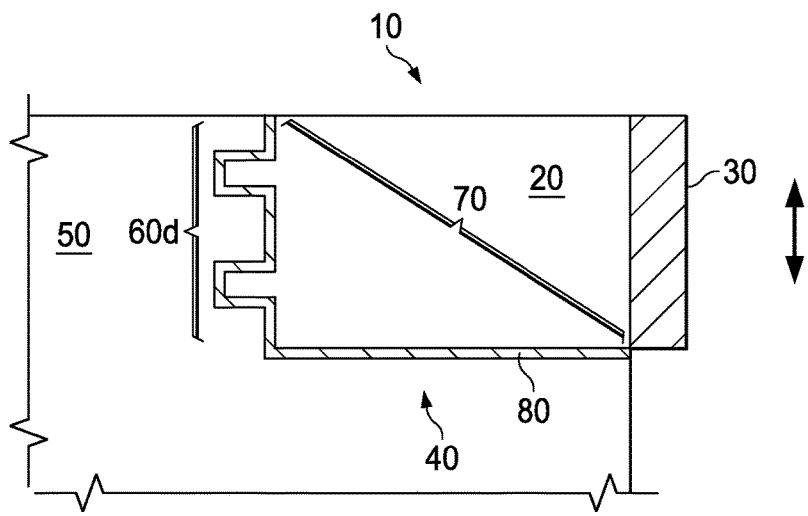
FIG. 4A is a side view of a fourth PCD element and industrial device with a mechanical lock.
Figure 4B:
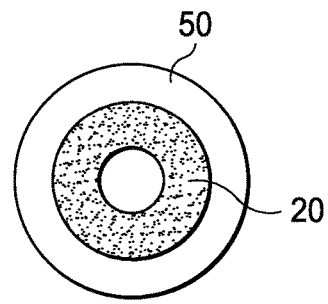
FIG. 4B is an end view of the mechanical lock of the PCD element of FIG. 4A.

FIG. 4A and FIG. 4B show side and end views of mechanical lock 60d, which is a variation of the lock shown in FIG. 3.

Figure 5:
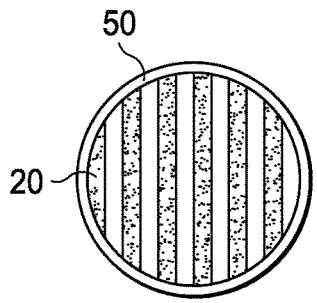
FIG. 5 is an end view of the mechanical lock of a fifth PCD element.

FIG. 5 shows an end view of mechanical lock 60e, which contains at least one or a series of parallel ridges located at the end of PCD element 10 and in an end wall of recess 40. Mechanical lock 60c helps prevent rotation of the PCD element within recess 40. Accordingly, mechanical lock 60c may not be compatible with some embodiments in which PCD element 40 is rotated within industrial device 50. However, mechanical lock 60c still allows a 180 degree rotation of the PCD element. Although the ridges of mechanical lock 60c are shown with a substantially rectangular cross-section, they may have other configurations, such as an angular or ellipsoid cross-section. Additionally, although the ridges of mechanical lock 60c are shown with substantially uniform width, in some embodiments, the width may vary.

In an alternative embodiment, ridges located at the end of PCD element 10 may be neither parallel nor concentric, but may instead have another regular or irregular pattern.

Figure 6:
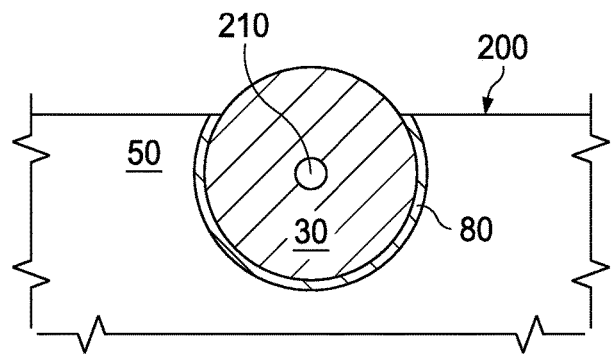
FIG. 6 is an end view of a sixth PCD element and industrial device with a mechanical lock.

As shown in FIG. 6, PCD element 10 may be located such that it rises above an exterior surface 200 of industrial device 50. In other embodiments, PCD element 10 may be entirely covered by recess 40 of industrial device 50. In either embodiment, a portion of the industrial device may further serve to mechanically lock PCD element 10 into industrial device 50.

PCD element 10 may, in some embodiments, be rotated within recess 40 around axis 210 by heating brazing material 80 to a sufficient temperature to allow such rotation. Some embodiments, such as those employing a screw, may be less compatible with rotation. Rotatable embodiments and the conditions under which rotation is possible will be apparent to one skilled in the art with the benefit of the disclosure contained herein.

Figure 7:
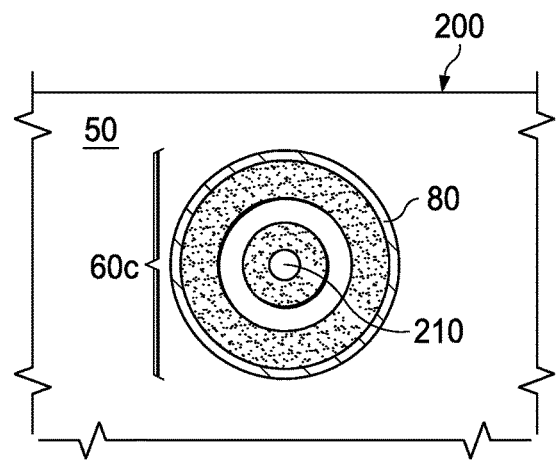
FIG. 7 is an end view of an industrial device with a mechanical lock without a PCD element.

FIG. 7 illustrates an exterior surface 200 of an industrial device 50 including a mechanical lock 60c without a PCD element 10.

Figure 8:
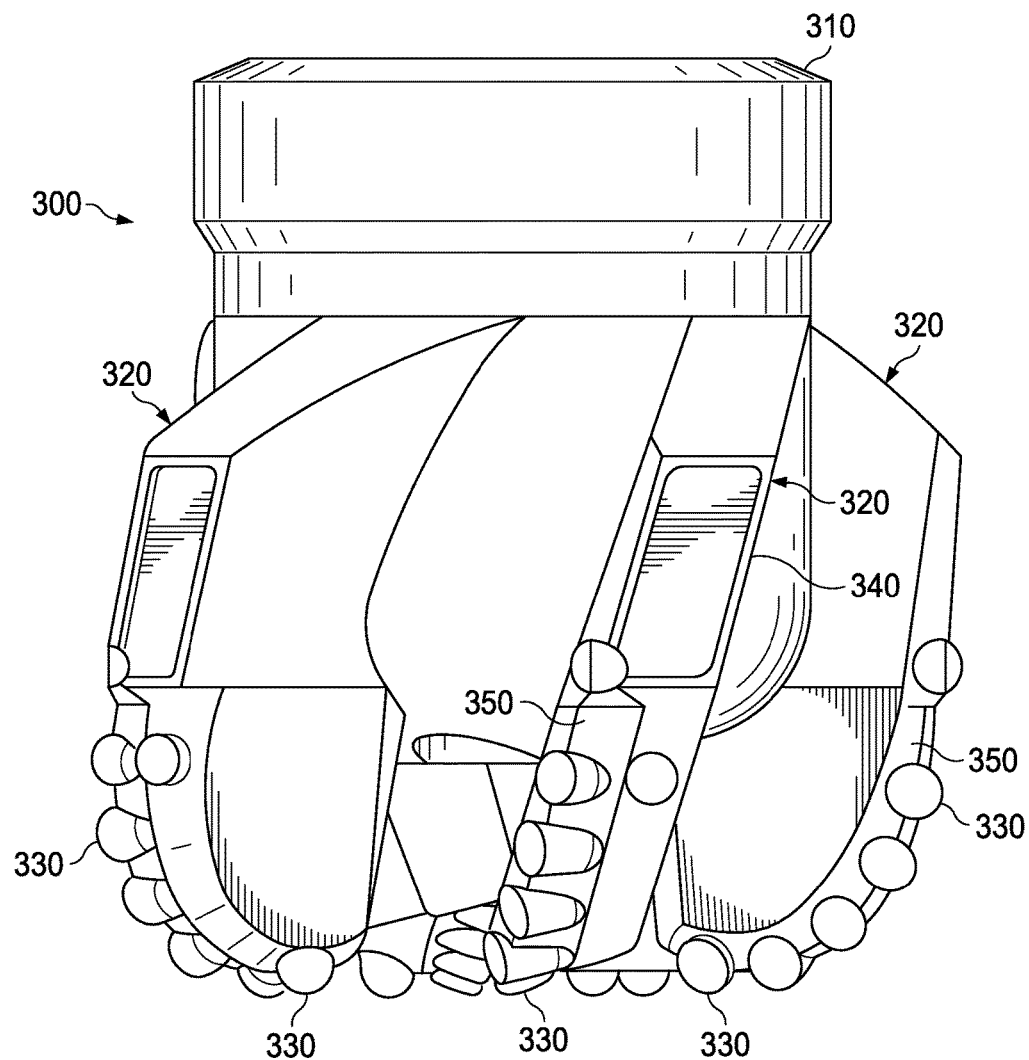
FIG. 8 is a side view of fixed cutter drill bit containing a PCD cutter.

In some embodiments, the industrial device may be an earth-boring drill bit, such as a fixed cutter drill bit. FIG. 8 illustrates a fixed cutter drill bit 300 containing a PCD cutter 10 in a recess 40. Fixed cutter drill bit 300 may include bit body 310 with a plurality of blades 320 extending therefrom. Bit body 310 may be formed from steel, a matrix material, or other suitable bit body material. Bit body 310 maybe formed to have desired wear and erosion properties. PCD elements may be mounted on the bit using methods of this disclosure or using other methods as elements other than cutters to provide such properties.

Blades 320 may include cutters 330, including at least one PCD cutter 10 with mechanical lock 60. In a specific embodiment, a set of cutter 330 at corresponding locations on blades 320 may each be a PCD cutter 10 with mechanical lock 60. In another embodiment, all gage cutters may be a PCD cutter 10 with mechanical lock 60. In another embodiment, all non-gage cutters may be a PCD cutter 10 with mechanical lock 60. In still another embodiment, all cutters 330 may be a PCD cutter 10 with mechanical lock 60.

For the embodiment shown in FIG. 8, fixed cutter drill bit 300 may have five (5) blades 320. For some applications the number of blades disposed on a fixed cutter drill bit incorporating teachings of the present disclosure may vary between four (4) and eight (8) blades or more. Respective junk slots 340 may be formed between adjacent blades 320. The number, size and configurations of blades 320 and junk slots 340 may be selected to optimize flow of drilling fluid, formation cutting and downhole debris from the bottom of a wellbore to an associated well surface.

Drilling action associated with drill bit 300 may occur as bit body 310 is rotated relative to the bottom (not expressly shown) of a wellbore in response to rotation of an associated drill string (not expressly shown). At least some cutters 330 disposed on associated blades 330 may contact adjacent portions of a downhole formation (not expressly shown) drilling. These cutters 330 may be oriented such that the PCD contacts the formation. The inside diameter of an associated wellbore may be generally defined by a combined outside diameter or gage diameter determined at least in part by respective gage portions 350 of blades 330.

Bit body 310 may be formed from various steel alloys or other materials having desired strength, toughness and machinability.

Although only exemplary embodiments of the invention are specifically described above, it will be appreciated that modifications and variations of these examples are possible without departing from the spirit and intended scope of the invention. For instance, the proper placement and orientation of PCD elements on other industrial devices may be determined by reference to the drill bit example.

The invention claimed is:

1. An earth-boring drill bit comprising:
a polycrystalline diamond (PCD) cutter located in a recess of an earth-boring drill bit, the PCD cutter and recess comprising an aligned mechanical lock, the mechanical lock comprising a series of ridges located at an end of the PCD cutter and in an end wall of the recess; and
a brazing material located along at least a portion of an interface between the PCD cutter and the recess,
wherein the mechanical lock maintains a uniform clearance between the PCD cutter and the recess along at least the portion of the interface between the PCD cutter and the recess where the brazing material is located.

2. The bit of claim 1, wherein the brazing material is located along substantially all of the interface.

3. The bit of claim 1, wherein the brazing material is located along substantially all of the mechanical lock.

4. The bit of claim 1, wherein the brazing material comprises manganese (Mn), aluminum (Al), phosphorus (P), silicon (Si), or zinc (Zn) alloyed with nickel (Ni), copper (Cu) or silver (Ag).

5. The bit of claim 1, wherein the earth-boring drill bit comprises a fixed cutter drill bit.

* * * * *

UNITED STATES PATENT AND TRADEMARK OFFICE
CERTIFICATE OF CORRECTION

PATENT NO. : 10,180,033 B2
APPLICATION NO. : 14/914712
DATED : January 15, 2019
INVENTOR(S) : Jay S. Bird et al.

Page 1 of 1

It is certified that error appears in the above-identified patent and that said Letters Patent is hereby corrected as shown below:

In the Claims

Claim 1, Column 6, Line 23:
After "ridges" insert --comprising concentric rings and--.

Signed and Sealed this
Nineteenth Day of February, 2019

Andrei Iancu
*Director of the United States Patent and Trademark Office*